No. 626,738. Patented June 13, 1899.
C. J. UNDERWOOD.
TOOTH CROWN.
(Application filed Oct. 7, 1898.)
(No Model.)
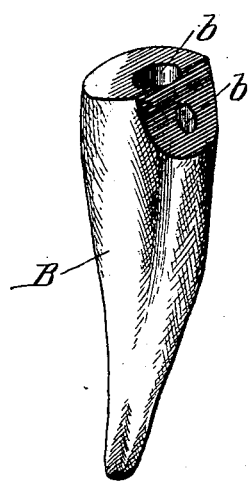
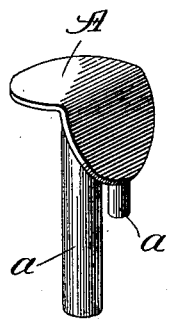
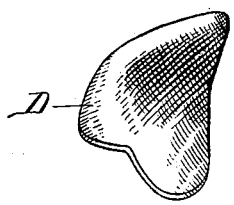
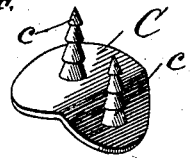
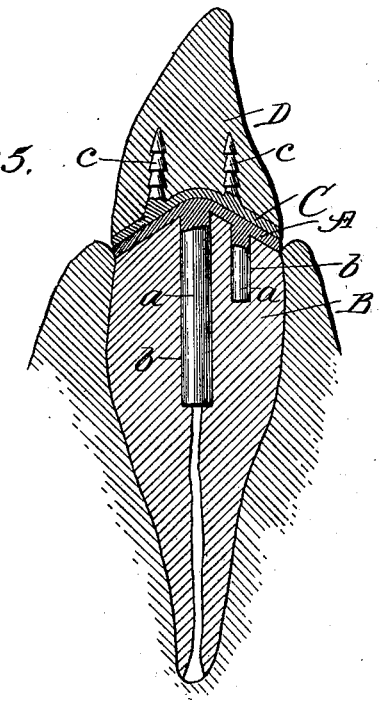
Witnesses:
Inventor:
Chester J. Underwood,

UNITED STATES PATENT OFFICE.

CHESTER J. UNDERWOOD, OF ELGIN, ILLINOIS, ASSIGNOR OF ONE-HALF TO GEORGE SHEPPARD, OF SAME PLACE.

TOOTH-CROWN.

SPECIFICATION forming part of Letters Patent No. 626,738, dated June 13, 1899.

Application filed October 7, 1898. Serial No. 692,951. (No model.)

*To all whom it may concern:*

Be it known that I, CHESTER J. UNDERWOOD, a citizen of the United States, residing at Elgin, Illinois, have invented certain new and useful Improvements in Tooth-Crowns, of which the following is a specification.

The object of my invention has more particular reference to the means for applying or attaching the crown of a tooth to the root, which means are adapted to permit greater facility, expedition, and accuracy in effecting the attachment; and my invention consists in the features and details of construction hereinafter described and claimed.

In the drawings, Figure 1 is a perspective view of a tooth-root; Fig. 2, a perspective view of the plate and pin intended to be applied to the root; Fig. 3, a perspective view of a tooth-crown; Fig. 4, a perspective view of a plate and the pins to which the tooth-crown is to be attached, and Fig. 5 a longitudinal section taken through the tooth root and crown when in their position of final adjustment and attachment.

In making my improvement in means for attaching tooth crowns and roots I make a root-plate A, preferably of platinum. The tooth-root B is cut or dressed into the most advantageous shape permitted by the particular circumstances of the case, which will require the root-plate to be bent into different shapes when applied to the particular root in connection with which it is to be used. I bore or drill one or more holes $b$ into the tooth-root of such a size and depth as will be adapted for the particular root under treatment. I provide the root-plate with one or more pins $a$ of such length and size as will adapt them to fit the hole or holes provided for them in the tooth-root. I then make a crown-plate C and provide it with dowel pins or anchors $c$. These pins are roughened in any desired way, but preferably as shown in the drawings, so as to effect a more secure attachment of the crown to the plate. I then place a crown-plate with its pins in a proper mold and build up on it an artificial crown D, of porcelain, which, being plastic, adapts itself to the shape of the crown-plate and the pins or anchors. I then bake the porcelain crown, so as to impart the requisite hardness to it. The baking causes the pins or anchors and the crown-plate to become practically integral portions of the crown, so that all liability or danger of separation between them is removed. I then apply the crown-plate with its crown attached to the root-plate, but preferably first place the root-plate with its pins in place on it and then adjust the crown-plate with its crown upon the root-plate and attach them together temporarily by wax. This enables me to get the exact position that the crown should occupy in the finished or completed tooth. I then remove the root-plate with the crown-plate and crown thus temporarily attached to it and then permanently attach them together by soldering. I thus have the tooth-plate and crown-plate practically as securely attached together as if they were formed of a single piece with the crown in position on the crown-plate. I then replace the root-plate with the other parts attached on the root, cementing the pins $a$ into the holes provided in the root to receive them. This completes the operation, so that I have the artificial crown attached to the root by means which are practically as strong, secure, and durable as if they were formed of a single integral piece.

What I regard as new, and desire to secure by Letters Patent, is—

1. The combination of a tooth-crown plate adapted to be applied to the end of a tooth-crown and provided with one or more pins arranged at a desired distance from the edges of the plate, and a tooth-crown molded and baked at its end upon the plate, whereby the tooth-crown plate may be detached at its edges from the tooth-crown to permit modifications of its form, substantially as described.

2. The combination of a tooth-crown plate adapted to be applied to the end of a tooth-crown and provided with one or more pins arranged at a desired distance from the edges of the plate and a tooth-crown molded and baked at its end upon the plate, and a root-plate adapted to be attached to a tooth-root, the crown-plate and the root-plate being soldered together, substantially as described.

CHESTER J. UNDERWOOD.

Witnesses:
THOMAS A. BANNING,
THOMAS B. MCGREGOR.